Dec. 25, 1962     E. C. CRANDALL ETAL     3,070,732
ELECTRIC CONTROL SYSTEM
Filed Sept. 19, 1961
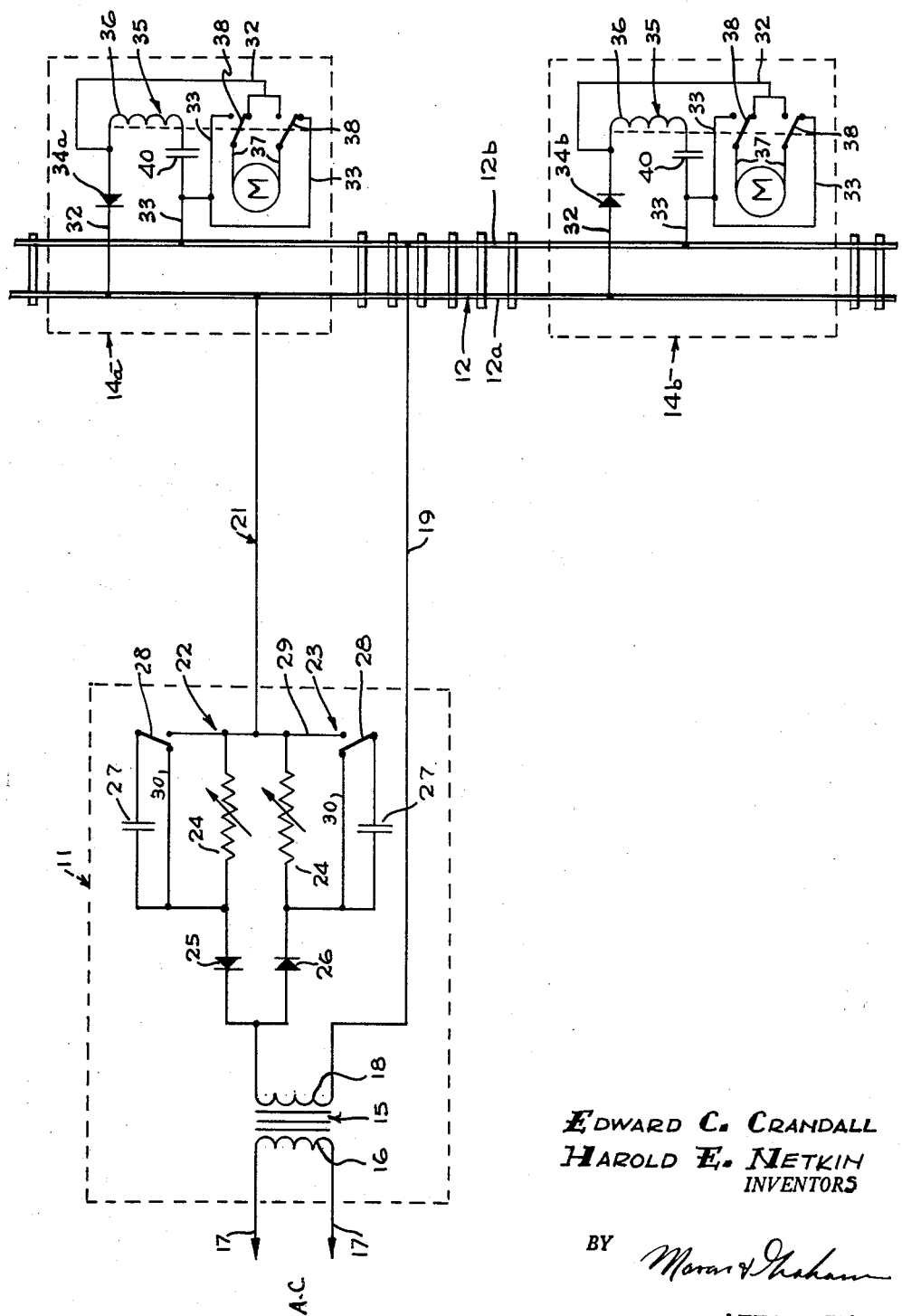
EDWARD C. CRANDALL
HAROLD E. NETKIN
INVENTORS
BY *Moran & Graham*
ATTORNEYS 3,070,732
ELECTRIC CONTROL SYSTEM
Edward C. Crandall, 140 S. Lasky Drive, Beverly Hills, Calif., and Harold E. Netkin, 3003¼ Bagley Ave., Los Angeles, Calif.
Filed Sept. 19, 1961, Ser. No. 139,108
3 Claims. (Cl. 318—55)

This invention has to do generally with electric control systems and more particularly with a system for independently controlling two loads connected in the circuit, such, for example, as two toy or miniature electric locomotives having D.C. motors operating on a single track system.

An object of the invention is to provide novel means for distributing electric current from a source of alternating current to provide simple means for individually controlling the speed and direction of two direct current motors. In this connection it is a particular object to provide a control system for individually controlling the speed of two trains on one track as well as individually controlling the direction of travel of the trains.

These and other objects will be apparent from the drawing, which is a schematic wiring diagram of the electrical control system.

Referring to the drawing, we show a control means which is generally designated by the numeral 11, a track system 12, which comprises the track rails 12a and 12b, it being understood that normally the track system would extend in any desired pattern and that only a portion of it has been shown for the purpose of illustration. Two locomotives, designated 14a and 14b, respectively, adapted to operate on the track system 12, are shown schematically.

The control means 11 includes a transformer 15 having a primary coil 16 adapted to be connected by leads 17 to a source or supply of alternating current. The secondary coil 18 of the transformer is connected at one end by conductor 19 to the rail 12b. The other end of the secondary coil is connected to the other rail 12a by conductor means 21 which includes a pair of control circuits designated 22 and 23 which are connected in parallel in the conductor means. Each control circuit includes a variable resistor 24, connected in series with a rectifier, the rectifiers being connected oppositely in the two circuits and designated by the numerals 25 and 26, respectively. It will be apparent that with this arrangement, each resistor can be used for controlling one-half the cycle of current fed to the track system. Each of the circuits 22 and 23 is provided with a condenser 27 which is normally inoperative, being normally connected at both its terminals to one side of the resistor 24. However, switch means 28 is provided along with a conductor 29 for the purpose of momentarily connecting the condenser across or in parallel with the variable resistor 24 with which it is associated. The switches 28 may be push-button switches for convenience and they are shown in their normal position.

When either switch 28 is closed the associated condenser 27 is charged and a pulse is produced in the curent fed to the track through the particular control circuit and, as will later become apparent, this pulse is used to operate a stepping relay located in the electric locomotive which is responsive to sudden increase of direct current flowing through the particular control circuit.

Refering now to the locomotives, each of these includes a motor M and a supply circuit for the motor. The latter includes the conductors 32 and 33 which are normally in contact with the rails 12a and 12b, respectively, of the track system. Conductor 32 of locomotive 14a is provided with a rectifier 34a, while conductor 32 of locomotive 14b is provided with a rectifier 34b connected oppositely with respect to the rectifier 34a. With this arrangement it will be apparent that the motors of the locomotives, which are reversible direct current motors, are each energized on one-half cycle of the supply current and that thus the direct current for one of the motors travels through the rectifier 25 in one direction while the direct current for the other locomotive motor travels through the rectifier 26 in the opposite direction, making it possible for the speed of the motors to be controlled individually by resistors 24.

In order to reverse the direction of the motors each is provided with a relay 35 including a coil 36 and a condenser 40 connected in series with each other and in parallel with the motor. This is a stepping type relay, and each time it is energized it serves to connect the motor leads 37 through the switch elements 38 to opposite ones of the conductors 32 and 33. With the arrangement shown, the relay is normally not energized but is designed to be energized by a pulse of current through condenser 40 resulting from the momentary charging of the appropriate condenser 27 in one of the control circuits 22 and 23 which results from momentarily closing the switches 28. Releasing switch to normal position discharges condenser 27 through conductor 30 putting condenser 27 back in its quiescent state.

Although we have illustrated and described preferred forms of our invention, we contemplate that various changes and modifications can be made therein without departing from the invention, the scope of which is indicated by the following claims.

We claim:

1. A control system for supplying variable amounts of electrical energy to a first reversible D.C. electric motor and to a second reversible D.C. electric motor and for individually reversing said motors, comprising a transformer having a primary coil adapted to be connected to a source of alternating current, said transformer having a secondary coil, a pair of distribution conductors, conductor means connecting one end of said secondary coil to one of said distribution conductors, controllable conductor means connecting the other end of said secondary coil to the other distribution conductor, said controllable conductor means including a pair of branch circuits connected in parallel in said controllable conductor means and each having a rectifier and a variable resistor in series, the rectifiers being disposed oppositely in said branch circuits, a condenser in each branch circuit normally connected to one end of the variable resistor thereof, switch means for momentarily individually connecting said condensers in parallel with the respective variable resistors and returning the same to normal connections, motor conductor means connecting each motor to said pair of distribution conductors and including a rectifier, the rectifier of one motor conductor means being connected oppositely to the rectifier of the other motor conductor means, and motor reverse switching means in each motor conductor means operable in response to a pulse of current resulting from the charge of the appropriate one of said condensers for effectively reversing the leads to the motor.

2. The control system set forth in claim 1 in which the motor reverse switching means includes a relay having a coil connected in parallel with the motor and a condenser in series with the coil.

3. The control system set forth in claim 1 in which said distribution conductors are the rails of a miniature train track, and in which said motors are carried by train locomotives operable on the track.

No references cited.